United States Patent
Matsunaga

(10) Patent No.: US 10,875,532 B2
(45) Date of Patent: Dec. 29, 2020

(54) TRAVELLING ASSIST APPARATUS

(71) Applicant: DENSO CORPORATION, Kariya (JP)

(72) Inventor: Shogo Matsunaga, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/458,701

(22) Filed: Jul. 1, 2019

(65) Prior Publication Data
US 2020/0010082 A1 Jan. 9, 2020

(30) Foreign Application Priority Data

Jul. 4, 2018 (JP) ................. 2018-127853

(51) Int. Cl.
| | |
|---|---|
| *B60Q 1/00* | (2006.01) |
| *B60W 30/12* | (2020.01) |
| *G08G 1/16* | (2006.01) |
| *B60W 30/095* | (2012.01) |

(52) U.S. Cl.
CPC .......... *B60W 30/12* (2013.01); *B60W 30/095* (2013.01); *G08G 1/167* (2013.01)

(58) Field of Classification Search
CPC ..... B60W 30/12; B60W 30/095; G08G 1/167
See application file for complete search history.

(56) References Cited

U.S. PATENT DOCUMENTS

| | | | |
|---|---|---|---|
| 9,701,307 B1* | 7/2017 | Newman ............. | B60W 10/184 |
| 2007/0063874 A1* | 3/2007 | Danz ..................... | B60Q 9/006 |
| | | | 340/932.2 |
| 2008/0015772 A1* | 1/2008 | Sanma ..................... | G08G 1/04 |
| | | | 701/408 |
| 2010/0094520 A1* | 4/2010 | Zagorski ................. | B60T 7/22 |
| | | | 701/70 |
| 2011/0010094 A1* | 1/2011 | Simon .................... | G08G 1/167 |
| | | | 701/301 |
| 2011/0130936 A1* | 6/2011 | Noda ..................... | G08G 1/167 |
| | | | 701/70 |

(Continued)

FOREIGN PATENT DOCUMENTS

| | | |
|---|---|---|
| JP | 2003-016599 A | 1/2003 |
| JP | 2003016599 A * | 1/2003 |

(Continued)

*Primary Examiner* — Quang Pham
(74) *Attorney, Agent, or Firm* — Maschoff Brennan

(57) ABSTRACT

A travelling assist apparatus executing a collision avoidance control between other vehicle and an own vehicle is provided with an approach determination unit determining whether the other vehicle will enter an own lane from an adjacent lane of the own lane; a passing determination unit determining whether the other vehicle is able to pass across the own lane; an interruption determination unit determining whether the other vehicle interrupts the own lane; and a collision avoidance unit executing the collision avoidance control under a condition where the interruption determination unit determines that the other vehicle interrupts the own lane and the passing determination unit determines that the other vehicle is able to pass across the own lane, and executes the collision avoidance control regardless of a determination of the interruption determination unit, when the passing determination unit determines that the other vehicle is unable to pass across the own lane.

4 Claims, 4 Drawing Sheets

(56) References Cited

U.S. PATENT DOCUMENTS

| | | | |
|---|---|---|---|
| 2013/0035916 A1* | 2/2013 | Girard | G06T 13/40 |
| | | | 703/6 |
| 2015/0360721 A1* | 12/2015 | Matsuno | B60W 30/18163 |
| | | | 701/41 |
| 2016/0335892 A1* | 11/2016 | Okada | G08G 1/123 |
| 2017/0158199 A1* | 6/2017 | Pallett | B60W 30/188 |
| 2017/0158225 A1* | 6/2017 | Brown | G05D 1/0088 |
| 2018/0122154 A1* | 5/2018 | Grush | H04W 4/021 |
| 2018/0178783 A1* | 6/2018 | Saiki | G08G 1/165 |
| 2018/0268702 A1* | 9/2018 | Morotomi | G08G 1/166 |
| 2018/0345978 A1* | 12/2018 | Fujii | B62D 15/0255 |
| 2019/0355132 A1* | 11/2019 | Kushleyev | G06T 7/74 |

FOREIGN PATENT DOCUMENTS

| | | |
|---|---|---|
| JP | 2011-196943 A | 10/2011 |
| JP | 2015-022421 A | 2/2015 |

* cited by examiner

FIG.3
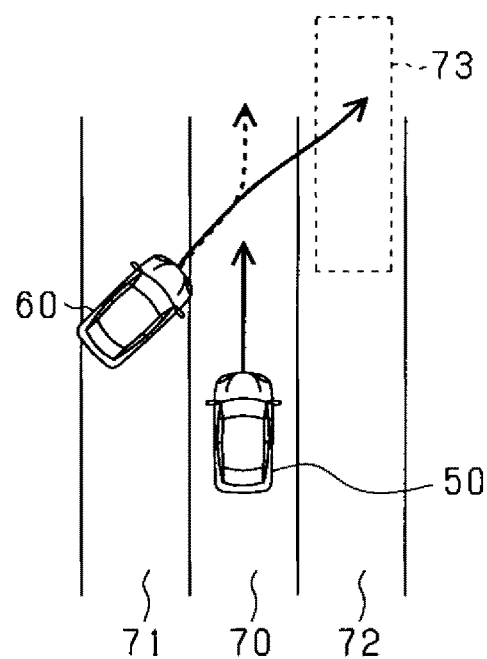
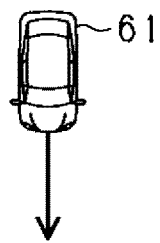
FIG. 4A       FIG. 4B
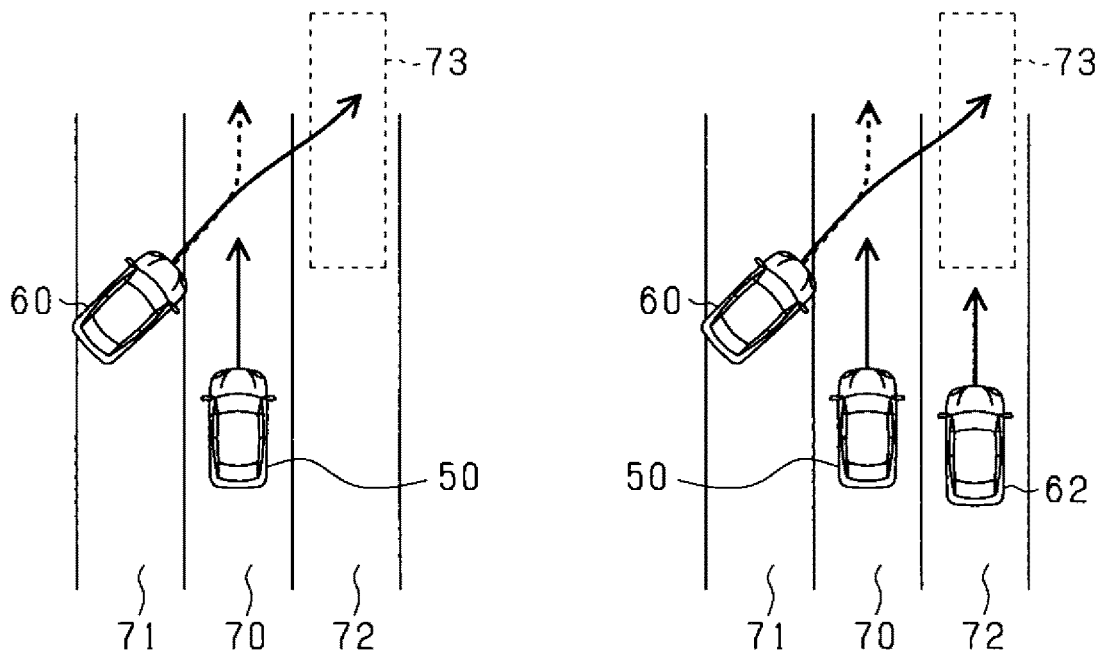

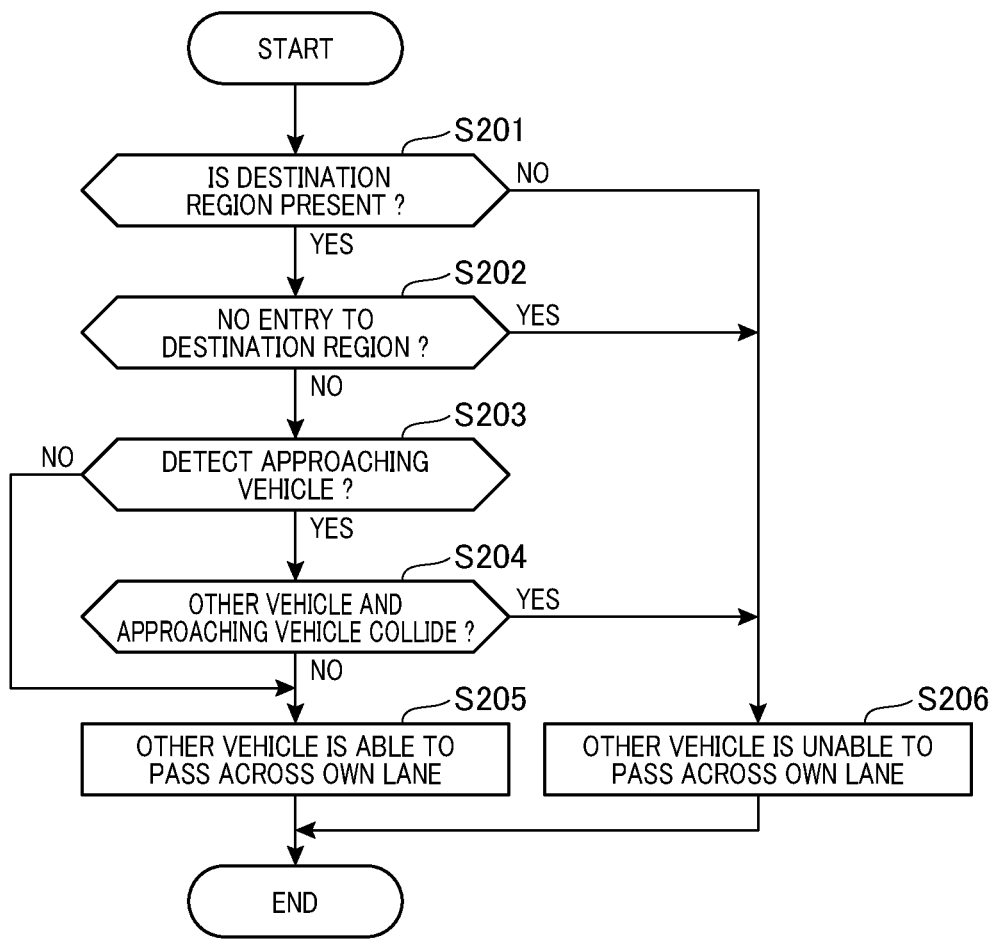

TRAVELLING ASSIST APPARATUS

CROSS-REFERENCE TO RELATED APPLICATION

This application is based on and claims the benefit of priority from earlier Japanese Patent Application No. 2018-127853 filed Jul. 4, 2018, the description of which is incorporated herein by reference.

BACKGROUND

Technical Field

The present disclosure relates to a travelling assist apparatus capable of performing a collision avoidance control between the own vehicle and an other vehicle near the own vehicle.

Description of the Related Art

A travelling assist apparatus is known. For example, a travelling assist apparatus that detects, based on a lateral distance with respect to the other vehicle in the lateral direction, a situation in which another vehicle cuts in a lane where the own vehicle travels as a preceding vehicle ahead of the own vehicle.

SUMMARY

According to the present disclosure, a travelling assist apparatus is provided which is adapted for a vehicle provided with an object detection apparatus that detects an object near an own vehicle, capable of executing a collision avoidance control between other vehicle and the own vehicle.

BRIEF DESCRIPTION OF THE DRAWINGS

In the accompanying drawings:

FIG. 3 is a diagram illustrating a destination region;

FIGS. 4A and 4B show an approaching vehicle proceeding towards the destination region;

FIG. 6 is a flowchart showing an own lane passing determination.

DETAILED DESCRIPTION OF THE PREFERRED EMBODIMENTS

Figure 1:
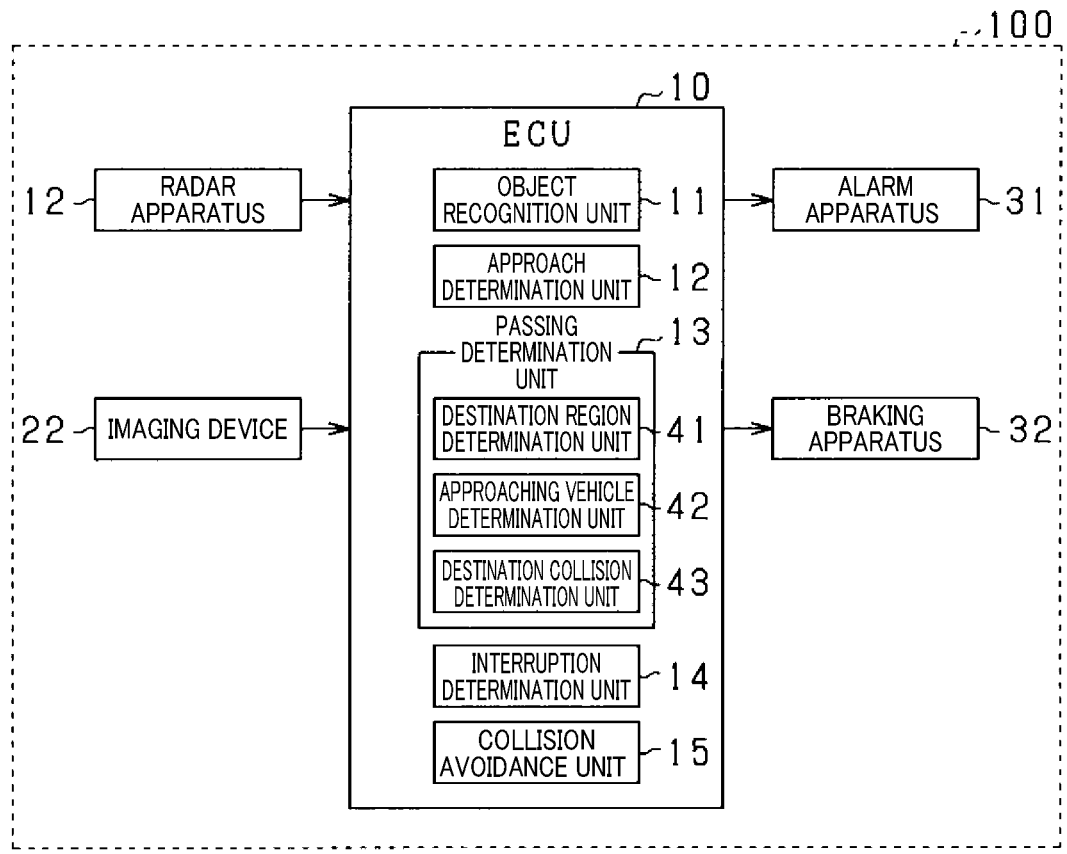
FIG. 1 is an overall diagram showing a travelling assist apparatus according to an embodiment of the present disclosure.

Hereinafter, with reference to the drawings, embodiments of the present disclosure will be described. It should be noted that in the embodiments set forth below, those components which are identical or equivalent to each other are given the same reference signs in the drawings. The explanation thereof will be applied to those components. The traveling assist apparatus according to the present embodiment is mounted on a vehicle (i.e. own vehicle) and executes a traveling assist process based on information of other vehicles existing around the own vehicle, for example, ahead of the own vehicle.

FIG. 1 is a block diagram illustrating a pre-crash-safety-system (i.e. PCS) 100 that performs a control so as to avoid a collision with other vehicle or to mitigate a damage of the collision. The PCS system 100 is an example of a vehicle system mounted on the vehicle. The PCS system 100 detects an object (e.g. other vehicle) existing around the own vehicle, and executes a collision avoidance operation of the own vehicle, or a collision mitigation operation as a travelling assist control of the object, when determining that the own vehicle possibly collides with the detected object.

The PCS system 100 shown in FIG. 1 is provided with a radar apparatus 21, an imaging device 22, a vehicle speed sensor 23, an electronic control unit (ECU) 10, an alarm apparatus 31 and a braking apparatus 32. According to an embodiment shown in FIG. 1 or the like, the radar apparatus 21 and the imaging device 22 serve as an object detection apparatus. The ECU 10 is applied for a vehicle to which the object detection apparatus that detects an object existing around the own vehicle is provided, and serves as a travelling assist apparatus capable of performing a collision avoidance control between the own vehicle and other vehicle traveling around the own vehicle.

The radar apparatus 21 is configured to detect an object ahead of the own vehicle 50 by using electromagnetic waves (probing waves) having directivity such as millimeter waves or laser waves. The radar apparatus 21 is mounted to a front part of the own vehicle 50 such that the optical axis is oriented ahead of the own vehicle 50. The radar apparatus 21 scans a region extended in a predetermined range ahead of the own vehicle 50 with the radar signal at predetermined periods, and receives electromagnetic waves reflected at a surface of the object ahead of the own vehicle 50, thereby acquiring the relative location and the relative speed of the object existing ahead of the own vehicle as the object information. Note that the relative location is acquired with the X axis defined as the vehicle width direction of the own vehicle 50, the Y axis defined as the travelling direction of the own vehicle 50 and the origin as the own vehicle 50. In the relative location, the X axis component (vehicle width direction) shows a lateral position of the object with respect to the own vehicle 50, and the Y axis component (travelling direction of the own vehicle 50) shows a distance to the object ahead of the own vehicle. The vehicle width direction may be referred to as a direction crossing (orthogonally) the travelling direction of the own vehicle 50. The acquired object information (detected information) is inputted to the ECU 10.

The imaging device 22 is configured as an on-vehicle camera including a CCD camera, a CMOS image sensor, a near infrared camera or the like. The imaging device 22 is mounted to the own vehicle 50 at a portion in the center of the vehicle width direction having a predetermined height (e.g. upper end of the windshield) and captures, as a perspective view, an area extending at a predetermined angle range ahead of the own vehicle. The captured image (detected information) is inputted to the ECU 10 at predetermined periods. Note that the imaging device 22 may be a single camera or a stereo camera.

The vehicle speed sensor 23 detects a travelling speed of the own vehicle 50 based on a rotation speed of the wheels. The detection result of the vehicle speed sensor 23 is inputted to the ECU 10.

The alarm apparatus 31 alerts the driver to a presence of an object ahead of the own vehicle 50 in response to a control command from the ECU 10 (i.e. to attract the driver's attention). The alert apparatus 31 is configured of a speaker provided in the vehicle cabin and a display unit that indicates an image.

The braking apparatus 32 brakes the own vehicle 50. The braking apparatus 32 is activated when a probability of collision with an object ahead of the own vehicle increases. Specifically, the braking apparatus 32 enhances the braking force in response to the braking operation of the driver (brake assist function), or performs automatic braking when the driver is not operating the brake (automatic braking operation).

The ECU 10 is configured of a known microprocessor provided with CPU, various memory units (i.e. ROM, RAM) and reads an operation program and control data stored in the memory unit to execute a control of the own vehicle 50. The ECU 10 detects information outputted from the radar apparatus 21, and an object (e.g. other vehicle) based on the captured image outputted from the imaging device 22, and executes a travelling assist control (PCS) for the alarm apparatus 31 and the braking apparatus 32 as the control objects.

The ECU 10 is provided with an object recognition unit 11, an approach determination unit 12, a passing determination unit 13, an interruption determination unit 14 and a collision avoidance unit 15.

The object recognition unit 11 performs an object recognition based on the detection information acquired by the radar apparatus 21 and the imaging device 22. Specifically, the object recognition unit 11 acquires the captured image (image data) from the imaging device 22, and determines the type of object existing ahead of the own vehicle based on the captured image and the dictionary information prepared in advance for recognizing objects. The dictionary information for recognizing objects is prepared individually for types of objects such as a vehicle, a two-wheel vehicle, pedestrian, and obstacles on the road. The dictionary information is stored in the memory unit in advance. For the dictionary information of the vehicle, at least a front part pattern and a rear part pattern are prepared. Further, the front and rear part patterns may preferably be prepared for each of a plurality of types of vehicles including, for example, a large sized vehicle, a standard sized vehicle, a light sized vehicle, and a light duty vehicle including a motorcycle and a bicycle. The object recognition unit 11 compares the captured image with the dictionary information using a pattern matching, thereby determining the types of objects. Also, the object recognition unit 11 acquires, based on the captured image and the dictionary information, the travelling direction of the own vehicle and the positional information of the object in the lateral direction thereof which substantially and orthogonally crosses the travelling direction of the own vehicle (including lateral width of the object and the like).

Also, the object recognition unit 11 calculates, based on the information (azimuth, location and travelling speed) about other vehicle detected by the radar apparatus 21, a lateral position and a lateral speed of the other vehicle in a direction crossing (e.g. orthogonally crossing) the travelling direction of the own vehicle. The information about the other vehicle (i.e. lateral position and lateral speed) is stored in RAM of the ECU 10 as history data. Hence, by using the history data, a lateral acceleration factor of the other vehicle in the direction crossing (e.g. orthogonally crossing) the travelling direction of the own vehicle is calculated. For example, the ECU 10 refers to the history data to identify a change in the lateral speed of the other vehicle, thereby calculating the lateral acceleration factor of the other vehicle based on the change in the lateral speed.

The approach determination unit 12 determines whether there is a situation where other vehicle will enter the own lane from one of the lanes adjacent to the own lane where the own vehicle travels. The approach determination unit 12 determines whether the other vehicle will enter the own lane based on the type of the object recognized by the object recognition unit 11, the positional information and the travelling speed information of the object.

Specifically, the approach determination unit 12 determines whether the other vehicle starts to change lane to the own lane from the adjacent lane, based on the lateral position and the lateral speed of the other vehicle which are acquired by the object recognition unit 11. In other words, the approach determination unit 12 determines whether the other vehicle travelling on the adjacent lane enters the own lane (including prediction of entering), based on the lateral position and the lateral speed of the other vehicle.

Figure 2A:
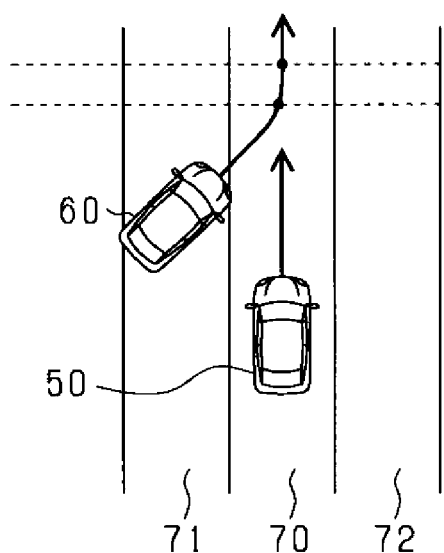
FIG. 2A is an explanatory diagram showing a situation where other vehicle cuts in the own lane.
Figure 2B:
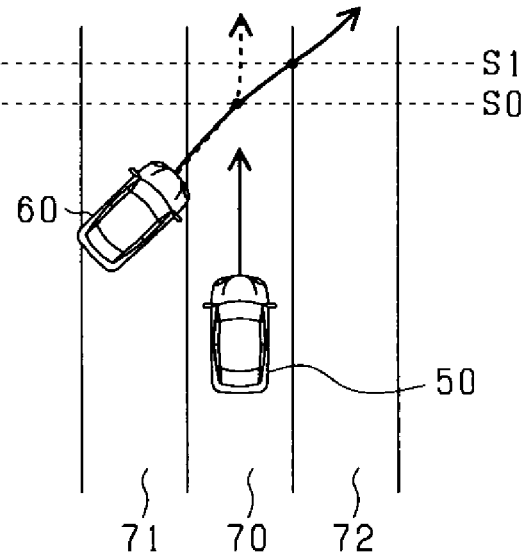
FIG. 2B is an explanatory diagram showing a situation where other vehicle passes the own lane and executes a double lane change.

For example, FIG. 2A and FIG. 2B illustrate a state where other vehicle 60 is entering the own lane 70 from adjacent lane 71 in the left side of the own lane 70 where the own vehicle 50 travels. The arrow of the solid line indicated in FIG. 2A shows a movement of the other vehicle 60 in the case where the other vehicle 60 cuts in ahead of the own vehicle 50 on the own lane 70 from the adjacent lane 71 in the left side, that is, a movement of the other vehicle 60 in the case where the other vehicle 60 continues to travel on the own lane 70 without passing across the own lane 70. The arrow of the solid line indicated in FIG. 2B shows a movement of the other vehicle 60 in the case where the other vehicle 60 passes ahead of the own vehicle 50 in the own lane 70 from the left side adjacent lane 71, and moves to the adjacent lane 72 on the right side of the own lane 70. The arrow of the dotted line refers to a comparison with the movement of the other vehicle 60 indicated by the solid line in FIG. 2A. Specifically, FIG. 2B illustrates a case where the other vehicle 60 performs a double lane change. The approach determination unit 12 determines that the other vehicle 60 is entering towards the own lane 70 in the case where the other vehicle 60 in the left side adjacent lane 71 moves towards the own lane 70 and the lateral speed of the other vehicle 60 (travelling speed in the lateral direction which substantially and orthogonally crosses the travelling direction of the own vehicle 50) is a predetermined speed threshold V1 or more. In both cases illustrated in FIG. 2A and FIG. 2B, the position and the lateral speed of the other vehicle 60 are the same, thus it can be determined that the other vehicle 60 is entering the own lane 70. Note that the travelling direction in the right side adjacent lane 72 may be the same as the travelling direction of the own lane 70 or may be opposite to that of the own lane 70. For example, in the case where the other vehicle 60 changes the lane to make a U-turn, the other vehicle 60 will change lane to the adjacent lane 72 which is an opposite traffic lane.

The passing determination unit 13, in the case where the approach determination unit 12 determines that the other vehicle will enter the own lane, determines whether the other vehicle is able to pass across the own lane. Preferably, the passing determination unit 13 may determine, based on a situation of the destination to which the other vehicle move passing across the own lane, whether the other vehicle is able to pass the own lane. Specifically, the passing determination unit 13 predicts the destination to which the other vehicle moves passing across the own lane, based on the position and the travelling speed of the other vehicle. Then, the passing determination unit 13 determines whether the other vehicle is able to pass across the own lane to reach the destination, based on the detection information or the like acquired by the radar apparatus 21 and the imaging device 22.

For example, as shown in FIG. 2A and FIG. 2B, when other vehicle 60 enters the own lane 70 from the left side adjacent lane 71, the passing determination unit 13 determines whether the other vehicle 60 is able to move to the right side adjacent lane 72 (destination), based on the information about the right side adjacent lane 72 as the destination. Then, when the passing determination unit 13 determines that the other vehicle 60 is able to move to the right side adjacent lane 72, it is determined that the other vehicle is able to pass across the own lane 70 as shown in FIG. 2B.

The passing determination unit 13 can be configured to determine whether the other vehicle is able to move to the destination, by using the predicted destination, regardless of whether an adjacent lane is present or not in the location as the predicted destination. Even if no right side adjacent lane 72 is present, the passing determination unit 13 may predict the destination similarly to the case where the right side adjacent lane is present, and may determine that the other vehicle 60 is unable to pass across the own lane 70, based on the determination that the other vehicle 60 is unable to move to the destination.

The passing determination unit 13 may be configured to determine that the other vehicle 60 is unable to pass across the own lane 70 immediately in the case where an adjacent is not present in the location to which the other vehicle 60 is expected to reach passing across the own lane 70.

The passing determination unit 13 may be provided with a destination region determination unit 41, an approaching vehicle determination unit 42 and a destination collision determination unit 43, and may determine whether the other vehicle is able to pass across the own lane, based on the determination results of respective determination units 41 to 43. The passing determination unit 13 may use all of the determination results of the destination region determination unit 41, the approaching vehicle determination unit 42, and the destination collision determination unit 43 or a part of the determination results.

The destination region determination unit 41 determines whether a destination region to which the other vehicle is predicted to move passing across the own lane is secured. The destination region is set to a location to which the other vehicle is predicted to reach when the other vehicle passes across the own lane. The destination region may be configured to determine that the other vehicle is unable to pass across the own lane, when determined that the destination region cannot be secured.

The approaching vehicle determination unit 42 determines whether an approaching vehicle moving to the destination region is present. The destination collision determination unit 43 determines whether the other vehicle will collide with the approaching vehicle in the destination region.

The passing determination unit 13 may be configured to determine that the other vehicle is able to pass across the own lane, in the case where the destination region determination unit 41 determines that the destination region can be secured, and the approaching vehicle determination unit 42 determines that no approaching vehicle is present.

Also, the passing determination unit 13 may be configured to determine that the other vehicle is able to pass across the own vehicle, in the case where the destination region determination 41 determines that the destination region is secured, the approaching vehicle determination unit 42 determines that the approaching vehicle is present, and the destination collision determination unit 43 determines that the other vehicle will not collide with the approaching vehicle in the destination region. On the other hand, the passing determination unit 13 may be configured to determine that the other vehicle is unable to pass across the own lane, when determined that the other vehicle will collide with the approaching vehicle in the destination region.

With reference to FIG. 3, specifically, when it is determined that the other vehicle 60 will enter ahead of the own vehicle 50 from the left side adjacent lane 71, the destination region determination unit 41 determines whether the destination region 73 is secured as a region where the other vehicle 60 is predicted to move. Specifically, for example, in the case where a region corresponding to the right side adjacent lane 72 is a sidewalk, a ledge or a levee, or a structure such as a median strip of the road or a guard rail are present between the own lane 70 and the right side adjacent lane 72, or the right side adjacent lane 72 is no entry road, or a stopping or parking vehicle is present in the right side adjacent lane 72, the destination region determination unit 41 determines that the destination region 73 cannot be secured. When determined that the destination region 73 cannot be secured, the passing determination unit 13 determines that the other vehicle is unable to pass across the own lane 70.

Also, as shown in FIG. 4A and FIG. 4B, the approaching vehicle determination unit 42 determines that an approaching vehicle is present when the object recognition unit 11 determines that an approaching vehicle 61 moves towards the destination region 73 from ahead of the own vehicle 70, or when the object recognition unit 11 determines that the approaching vehicle 62 moves towards the destination region 73 from behind the own vehicle 70. When determined that the destination region 73 can be secured and the approaching vehicles 61 and 62 are not present, it is determined that the other vehicle 60 passes across the own vehicle 70.

Further, when determined that the destination region 73 can be secured and the approaching vehicles 61 and 62 are not present, the destination collision determination unit 43 determines whether the other vehicle 60 and the approaching vehicles 61 and 62 will collide with each other. For example, a time to collision (i.e. TTC) between the other vehicle 60 and the approaching vehicles 61 and 62 is calculated, and determines that the other vehicle 60 and the approaching vehicles 61 and 62 will collide with each other, when the time to collision is less than or equal to a predetermined collision determination threshold T1. For example, the relative distance is divided by the relative speed to calculate the time to collision, based on the distance and the relative speed between the other vehicle 60 and the approaching vehicles 61 and 62. In the destination region 73, when determined that the other vehicle 60 and the approaching vehicles 61 and 62 collide with each other, the passing determination unit 13 determines that the other vehicle 60 cannot pass across the own lane 70. In contrast, in the destination region 73, when determined that the other vehicle 60 and the approaching vehicles 61 and 62 will not collide with each other, the passing determination unit 13 determines that the other vehicle 60 is able to pass across the own lane 70.

The interruption determination unit 14 determines whether the other vehicle interrupts the own lane. Specifically, when determined that other vehicle will not enter the own lane temporarily but will travel on the own lane continuously, the interruption determination unit 14 determines that the other vehicle will enter the own lane. The interruption determination unit 14 is able to determine whether the other vehicle interrupts the own lane based on the situation of the other vehicle. Specifically, the interruption determination unit 14 is able to determine whether the other vehicle will enter the own lane based on the orientation of the vehicle body, the position, the travelling speed, and ON/OFF state of the turn signal of the other vehicle. More specifically, the interruption determination unit 14 is able to determine that the other vehicle will interrupt the own lane when the acceleration factor in the lateral direction of the other vehicle becomes more negative on the own lane.

Also, the interruption determination unit 14 may be configured to determine that the other vehicle will enter the own lane when the other vehicle completes to interrupt the own lane. For example, as shown in FIG. 2A and FIG. 2B, in a state where each of the other vehicles 60 travels along the solid lines to reach the position S1, the other vehicle 60 interrupting the own lane 70 shown in FIG. 2A and the other vehicle 60 interrupting the own lane 70 shown in FIG. 2B are both present in the own lane 70 such that orientation of the vehicle bodies are the same and both are in same position with respect to the own vehicle 50. Further, the travelling speed (i.e. travelling speed in the travelling direction and the lateral direction on the own lane) of the other vehicles 60 are almost the same. Hence, the interruption determination unit 14 determines that the other vehicle 60 has not completed interrupting the own lane 70 at the position S1.

In contrast, when each of the other vehicles 60 travels along the solid arrow line to reach the position S0, the position and the orientation of the vehicle body of the other vehicle interrupting the own lane 70 shown in FIG. 2A, and the position and the orientation of the vehicle body of the other vehicle 60 interrupting the own lane 70 shown in FIG. 2B are different. In FIG. 2A, the other vehicle 60 at the position S0 is present ahead of the own vehicle in the own lane 70 and the orientation of the vehicle body is the same as the travelling direction of the own vehicle. Since the other vehicle 60 travels along the travelling direction 70, the interruption determination unit 14 determines that the other vehicle 60 has completed interrupting the own lane 70. On the other hand, in FIG. 2B, the other vehicle 60 at the position S0 is present at a portion of a diagonally forward and right of the own vehicle 50, being in a position between the own lane 70 and the right side adjacent lane 72, and the vehicle body is oriented towards a diagonally forward right direction of the own vehicle 50. Since the other vehicle 60 is not travelling along the travelling direction own lane 70, the interruption determination unit 14 determines that the other vehicle 60 has not completed interrupting the own lane 70.

The collision avoidance unit 15 executes a collision avoidance control between the other vehicle 60 and the own vehicle 50. Note that the collision avoidance control includes a collision avoidance determination and a command of a collision avoidance operation executed based on the collision avoidance determination result when necessary. The collision avoidance unit 15 sets a collision predicted region in a portion ahead of the travelling direction of the own vehicle. Then, the collision avoidance unit 15 performs a collision determination for a subject object existing in the collision predicted region based on the positional information of the subject object recognized by the object recognition unit 11, thereby determining whether a command of the collision avoidance operation is executed. The collision avoidance operation refers to an operation to avoid or mitigate a collision of the own vehicle with others. Specifically, an alert for the driver, a travelling control of the own vehicle (e.g. automatic steering control, automatic barking and the like) can be exemplified.

More specifically, with reference to FIG. 2A and FIG. 2B, the collision avoidance unit 15 calculates the time to collision (TTC) between the other vehicle and the own vehicle 50 based on the distance (intervehicle distance) and the relative speed between the other vehicle 60 and the own vehicle 50 (e.g. by dividing the relative distance by the relative speed), when the other vehicle 60 is present within the collision predicted region.

Then, the collision avoidance unit 15 compares the TTC with an activation timing of the collision avoidance control, thereby determining whether to issue a command for the collision avoidance operation. The activation timing is set for respective apparatuses such as the alarm apparatus 31, and the braking apparatus 32 capable of performing the collision avoidance operation.

When determining to issue a command for the collision avoidance operation, the collision avoidance unit 15 transmits a command signal for executing the collision avoidance operation, to respective apparatuses such as the alarm apparatus 31 and the braking apparatus 32 capable of performing the collision avoidance operation. Specifically, the collision avoidance unit 15 operates a speaker or the like to alert the driver when the TTC is less than or equal to the operation timing of the alarm apparatus. Also, when the TTC is less than or equal to the operation timing of the braking apparatus 32, an operation control to activate the automatic braking is executed so as to lower a collision speed.

The collision avoidance unit 15 executes, when the passing determination unit 13 determines that the own vehicle is able to pass across the own lane, a collision avoidance control between other vehicle and the own vehicle, under a condition where the interruption determination unit 14 has determined that the other vehicle will interrupt the own lane. More specifically, with reference to FIG. 2A and FIG. 2B, when the passing determination unit 13 determines that the other vehicle 60 passes across the own lane 70, the collision avoidance unit 15 executes a collision avoidance control if the interruption determination unit 14 determines that the other vehicle 60 will interrupt the own lane when the other vehicle 60 reaches the position S1.

In contrast, the collision avoidance unit 15 executes, when the passing determination unit 13 determines that the other vehicle is unable to pass across the own lane, a collision avoidance control between the other vehicle and the own vehicle regardless of the determination of the interruption determination unit 14. For example, the collision avoidance unit 15 may be configured to execute the collision avoidance control when the passing determination unit 13 determines that the other vehicle is unable to pass across the own lane, without executing the determination by the interruption determination unit 14. Also, in the case where the interruption determination unit 14 starts to execute the determination process before acquiring the determination result by the passing determination unit 13, the collision avoidance unit 15 may be configured to execute the collision avoidance control immediately at a time when the passing determination unit 13 determines that the other vehicle is unable to pass across the own lane. In the case where the passing determination unit 13 determines that the other vehicle is unable to pass across the own lane, the collision avoidance unit 15 may immediately execute processes related to the collision avoidance control without waiting for the determination result of the interruption determination unit 14, or may stop the interruption determination.

More specifically, with reference to FIG. 2A and FIG. 2B, when the passing determination unit 13 determines that the other vehicle 60 is unable to pass across the own lane 70, the collision avoidance unit 15 executes the collision avoidance control even if the other vehicle 60 is present at the position S1. In the case where the passing determination unit 13 determines that the other vehicle 60 is unable to pass across the own lane 70, since the other vehicle 60 is predicted to interrupt the own lane 70, the interruption determination result by the interruption determination unit 14 is not necessary. Hence, without waiting for the other vehicle to reach the position S0, the collision avoidance unit 15 is able to perform the collision avoidance control in a state where the other vehicle 60 is present at the position S1. As a result, the collision avoidance determination is completed earlier so that the collision avoidance operation can be performed accurately and promptly for the other vehicle 60.

Figure 5:
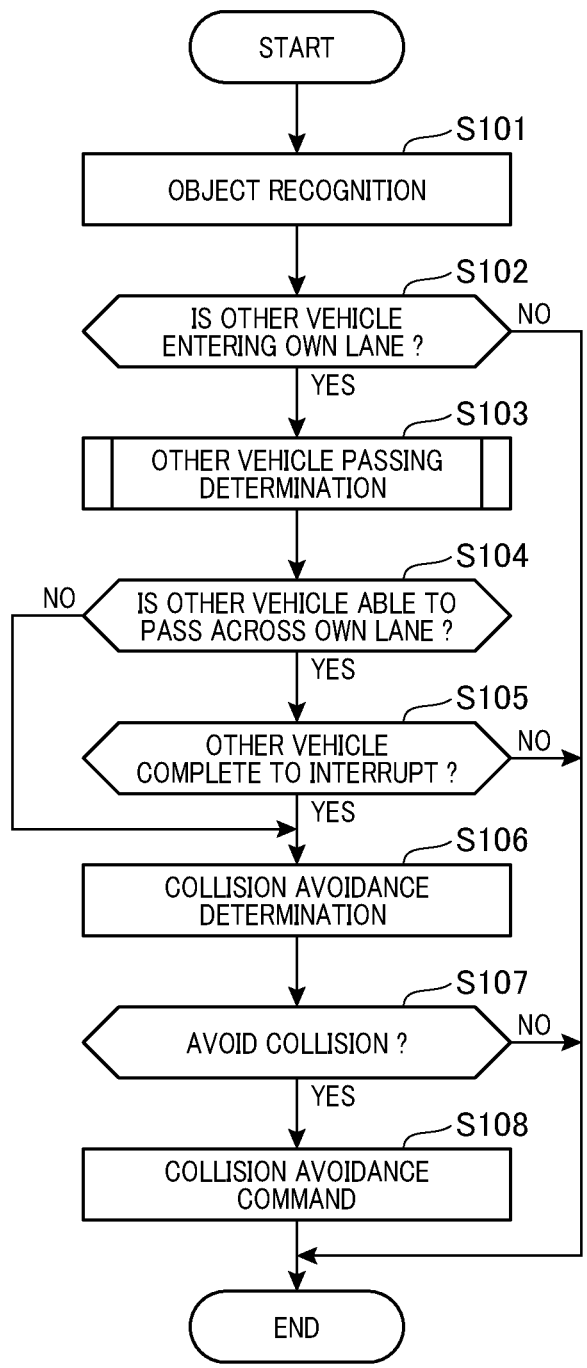
FIG. 5 is a flowchart showing a travelling assist control according to the embodiment.

FIG. 5 is a flowchart showing a travelling assist control performed by the ECU 10. The processes shown in FIG. 5 is repeatedly executed at predetermines periods.

At step S101, the process performs an object recognition based on the detection information acquired by the radar apparatus 21 and the imaging device 22, and proceeds to step S102.

At step S102, the process determines whether there is a situation where another vehicle will enter the own lane from either one lane among adjacent lanes of the own lane where the own vehicle travels. When it is determined that another vehicle entering the own lane or other vehicle predicted to enter the own lane is present, the process proceeds to step S103. When determined that no other vehicles entering the own lane are present, the process is terminated.

At step S103, the process determines whether the other vehicle predicted to enter the own lane will pass across the own lane. This determination is executed in accordance with the flow chart shown in FIG. 6.

First, at step S201, the process estimates a destination region to which the other vehicle is predicted to move passing across the own lane. Then, the process determines whether an empty region is present in the destination region where the other vehicle is able to move. At step S103, the process determines that the destination region is not present in the case where physical barriers are present, which will prevent the other vehicle from moving to the destination region.

For example, as shown in FIG. 3, when determined that the other vehicle 60 will enter a region ahead of the own vehicle 50 from the left side adjacent lane 71, the process determines whether the destination region 73 is secured in the right side adjacent lane 72 as a region where the other vehicle 60 is predicted to move. Then, the process determines that the destination region 73 is not present, in the case where a region corresponding to the right side adjacent lane 72 is a sidewalk, a ledge or a levee, or a structure such as a median strip of the road or a guard rail are present between the own lane 70 and the right side adjacent lane 72, or a stopping or parking vehicle is present in the right side adjacent lane 72. At step S201, when determined that the destination region is present, the process proceeds to step S202. At step S201, when determined that no destination region is present, the process proceeds to step S206, determines that the other vehicle is unable to pass across the own lane, and returns to step S104.

At step S202, the process determines whether entry to the destination region is prohibited. At step S202, when movement to the destination region is prohibited due to the traffic regulation or the like, even there is a vacant space in the destination region, the process determines that the entry to the destination region is prohibited. For example, when the right side adjacent lane 72 shown in FIG. 3 is defined as an entry prohibited region of vehicle (no entry), the destination region 73 is determined to be a region where entry is prohibited. At step S202, when determined that the destination region is not a no-entry region, the process proceeds to step S203. When determined that the destination region is a no-entry region, the process proceeds to step S206, determines that other vehicle is unable to pass across the own lane, and proceeds to step S104.

At step S203, the process determines whether an approaching vehicle moving towards the destination region is present. As shown in FIG. 4A and FIG. 4B, the process determines that an approaching vehicle is present in the case where the approaching vehicle 61 moving towards the destination region 73 from ahead of the own vehicle is detected, or the approaching vehicle 62 moving towards the destination region 73 from the behind is detected. At step S203, when determined that an approaching vehicle moving towards the destination region is present, the process proceeds to step S204. At step S203, when determined that no approaching vehicle moving towards the destination region is present, the process proceeds to step S205, determines that the other vehicle is able to pass across the own lane, and returns to step S104.

At step S204, the process determines whether the other vehicle and the approaching vehicle will collide with each other in the destination region. Specifically, the process calculates a time to collision (TTC) for the other vehicle 60 and the approaching vehicles 61 and 62, and determines that the vehicles will collide with each other when the TTC is less than or equal to the predetermined collision determination threshold T1. At step S204, when determined that the other vehicle and the approaching vehicle will not collide with each other in the destination region, the process proceeds to step S205, determines that the other vehicle is able to pass across and returns to step S104. At step S204, when determined that the other vehicle and the approaching vehicle will collide with each other in the destination region, the process proceeds to step S206, determines that the other vehicle is unable to pass across the own lane, and returns to step S104.

At step S104, the process determines whether the other vehicle has determined to be able to pass across the own lane. When the process determines, at step S103, that the other vehicle is able to pass across the own lane, the process proceeds to step S105. When determined that the other vehicle is unable to pass across the own lane, the process proceeds to step S106 without executing step S106.

At step S105, the process determines whether the other vehicle which has been determined to enter the own lane, has completed the interruption to the own lane. For example, as shown in FIG. 2A, similar to the other vehicle 60 at the S1 position, when it is determined that the other vehicle is travelling on the own lane 70 in the travelling direction thereof, the process determines that the other vehicle 60 has completed interrupting the own lane 70. On the other hand, similar to the other vehicle 60 at the S0 position shown in FIG. 2A and FIG. 2B, when the process cannot determine that the other vehicle 60 travels in the travelling direction of the own lane 70, the process determines that the other vehicle 60 has not completed interruption the own lane 70. Similarly, for the other vehicle 60 at the S1 position shown in FIG. 2B, the process determines that the other vehicle 60 has not completed interruption the own lane 70. When determined that the other vehicle has completed interruption the own lane 70, the process proceeds to step S106. When determined that the other vehicle has not completed interruption the own lane 70, the process terminates the procedure.

As shown in steps S103 to S106, the ECU 10 determines whether the other vehicle determined to enter the own vehicle is able to pass across the own lane or is unable to pass across the own lane. Then, when the process determines that the other vehicle is able to pass across the own lane, the process executes the collision avoidance determination process of step S106 under a condition where the determination at step S105 is that the other vehicle has completed interruption the own lane. In this case, as shown in FIG. 2A, the collision avoidance determination is started at a time when the other vehicle 60 reaches the position S1 which is farther than the position of the own vehicle 50.

On the other hand, when determined that the other vehicle is unable to pass across the own lane, the process executes the collision avoidance determination process of step S106 without executing the determination process of step S105 determining whether the other vehicle has completed to interrupt the own lane. In this case, as shown in FIG. 2B, the process is able to start the collision avoidance process at a time when the other vehicle 60 reaches the position S0 which is closer to the position of the own vehicle 50. Accordingly, the process of step S105 is omitted so that the collision avoidance determination of step S106 can be promptly executed. Hence, since the collision avoidance determination is completed early, the collision avoidance control can be executed more accurately.

At step S106, the process executes a collision avoidance determination between an other vehicle determined to enter the own lane, and the own vehicle, and then proceeds to step S107. At step S107, the process determines whether to execute the collision avoidance operation or not, based on the determination result of step S106. When executing the collision avoidance operation, the process proceeds to step S108 and transmits a command signal in order avoid collision to the alarm apparatus 31 and the braking apparatus 32.

In the flowchart shown in FIG. 5, the process executes the determination process whether the interruption indicated at step S105 has completed or not, after executing the processes of steps S103 and S104. However, it is not limited to these processes. For example, at step S103, when determining a situation where the other vehicle is entering the own lane from either one lane among adjacent lanes, the process may immediately start the interruption complete determination for the other vehicle. In this case, when determined that the other vehicle is unable to pass across the own lane in the process at step S103, the process at step S105 may be suspended and the process may immediately proceed to step S106.

According to the above-described embodiment, the following significant effects can be obtained.

The ECU 10 is provided with the approach determination unit 12, the passing determination unit 13, the interruption determination unit 14 and the collision avoidance unit 15. The approach determination unit 12 determines whether the other vehicle 60 will enter the own lane 70 from an adjacent lane. The passing determination unit 13 determines, when the approach determination unit 12 determines that the other vehicle 60 enters the own lane, whether the other vehicle 60 is able to pass across the own lane 70 towards the other side adjacent lane as the destination. In the case where the approach determination unit 12 determines that the other vehicle 60 is entering the own lane, the interruption determination unit 14 determines that the other vehicle 60 will enter the own lane 70, based on the situation of the other vehicle 60 (i.e. lateral speed, lateral acceleration factor, position and the like). The collision avoidance unit 15 executes a collision avoidance control between the other vehicle 60 and the own vehicle 50, when the passing determination unit 13 determines that the other vehicle 60 is able to pass across the own lane 70, under a condition where the interruption determination unit 14 has determined that the other vehicle 60 will interrupt the own lane. Accordingly, unnecessary collision avoidance control can be suppressed in the case where the other vehicle 60 will not interrupt the own lane.

On the other hand, according to the ECU 10, when the passing determination unit 13 determines that the other vehicle 60 is unable to pass across the own lane 70, the collision avoidance unit 15 performs the collision avoidance control regardless of the determination of the interruption determination unit 14. In the case where the passing determination unit 13 determines that the other vehicle 60 is unable to pass across the own lane 70, the interruption determination by the interruption determination unit 14 is omitted so that the collision avoidance determination control can be promptly performed. Hence, the processing time in the ECU 10 can be reduced.

The passing determination unit 13 is provided with the destination region determination unit 41. The destination region determination unit 41 determines whether the destination region 73 is secured in the other adjacent lane 72 as a region where the other vehicle 60 is predicted to move. For example, the destination region determination unit 41 determines whether an empty region is physically present in the destination region 73, or whether the destination region 73 is determined as no-entry region, thereby determining whether the destination region is secured. Then, in accordance with this determination result, the passing determination unit 13 accurately and promptly determines whether the other vehicle 60 is able to pass across the own lane 70.

The passing determination unit 13 is provided with the approaching vehicle determination unit 42 and a destination collision determination unit 43. The approaching vehicle determination unit 42 determines whether the approaching vehicles 61 and 62 moving towards the destination region 73 are present, where the destination region 73 is set on the other side adjacent lane, to which the other side vehicle 60 is predicted to move. Also, the destination collision determination unit 43 determines whether the other vehicle 60 and the approaching vehicles 61 and 62 will collide with each other in the destination region 73. The approaching vehicle determination unit 42 and the destination collision determination unit 43 can execute a collision determination between the other vehicle 60 and the approaching vehicles 61 and 62, when the other vehicle 60 enters the destination region 73. Hence, in accordance with this determination result, the passing determination unit 13 accurately and promptly determines whether the other vehicle 60 is able to pass across the own lane 70.

OTHER EMBODIMENTS

The present disclosure is not limited to the above-described embodiments, but may be modified in various manners as follows. Note that the same reference numbers are applied to the same or equivalent portions, and the same explanation will be applied to the same portions thereof.

In the above-described embodiments, the ECU 10 may perform a travelling assist control (PCS) by using a seatbelt device. The seatbelt device is configured of a seatbelt provided for each seat in the own vehicle 50, and a pretensioner that winds the seatbelt. The seatbelt device performs a pre-operation of winding the seatbelt as a PCS operation when a probability of collision between the own vehicle 50 and the other vehicle 60 increases. When the collision cannot be avoided, the pretensioner winds the seatbelt to be tightened such that the passengers such as the driver are fixed to the seat for protecting the passengers.

The other vehicle 60 is not limited to a four wheel vehicle but may include a two wheel vehicle or a bicycle.

In the above-described embodiments, in the case where a plurality of other vehicles 60 are detected, the travelling assist process may be executed for each vehicle or other vehicle located closest to the own vehicle 50.

According to the above-described embodiments, it is determined whether a probability of collision between the own vehicle 50 and the other vehicle 60 is high or not, based on the time to collision (TTC). However, other methods may be used to determine the probability of collision. For example, a predicted travelling route of the own vehicle 50 is identified based on the steering angle and the travelling speed of the own vehicle, a predicted travelling route of the other vehicle 60 is identified based on information (position, travelling speed) of the other vehicle 60, and may determine whether the predicted traveling routes of the own vehicle and the other vehicle cross each other, thereby determining a probability of collision.

According to the above-described embodiments, the radar apparatus 21 and the imaging device 22 detect other vehicles 60. However, other apparatuses may be used to detect other vehicles 60. For example, the other vehicle 60 and the own vehicle 50 may be communicably configured, and may detect the other vehicle 60 based on information transmitted from the other vehicle 60. Also, a laser sensor may be used as a vehicle detection apparatus. Further, either the radar apparatus 21 or the imaging device 22 may be used.

According to the above-described embodiments, the ECU 10 calculates the travelling direction or the like of the other vehicle 60 based on the object information detected by the radar apparatus 21 and the captured image of the imaging device 22. However, the radar apparatus 21 or the imaging device 22 may calculate them. Also, the ECU 10 may output the calculation result.

According to the above-described embodiments, the ECU 10 may arbitrarily change the contents of the collision avoidance control.

The travelling assist apparatus according to the present disclosure is described so far.

In the field of travelling assist apparatus of the present disclosure, a travelling assist apparatus mounted on a vehicle has become more common in order to prevent a collision accident caused by another vehicle travelling towards the travelling direction of the own vehicle from a lateral direction. As the travelling assist apparatus, for example, a patent literature discloses a technique that detects, based on a lateral distance with respect to the other vehicle in the lateral direction, a situation in which another vehicle cuts in a lane where the own vehicle travels as a preceding vehicle ahead of the own vehicle.

According to the above-mentioned patent literature, a collision avoidance control is performed when determining that other vehicle moves into the own lane from an adjacent lane based on a lateral distance with respect to the other vehicle and a change in the lateral distance, to predict that the other vehicle will cut in to the own lane. Hence, due to a so-called double lane change or the like, in the case where other vehicle runs towards the right side adjacent lane from the left side adjacent lane to pass through the own lane for example, the other vehicle may be determined be cutting in to the own lane. Therefore, unnecessary collision avoidance control may be executed. In order to minimize execution of the unnecessary collision avoidance control, it is effective to execute the collision avoidance control under a condition where the other vehicle is determined to cut in to the own lane but not pass across the own lane. On the other hand, a processing time to determine whether the other vehicle cuts in to the own lane or not may preferably be reduced in order to accurately and promptly execute the collision avoidance control.

The present disclosure has been achieved in light of the above-described circumstances and provides a technique of reducing a processing time in a travelling assist apparatus capable of suppressing unnecessary collision avoidance control.

The travelling assist apparatus according to the present disclosure includes: an approach determination unit that determines whether the other vehicle will enter an own lane where the own vehicle travels from an adjacent lane of the own lane; a passing determination unit that determines whether the other vehicle is able to pass across the own lane; an interruption determination unit that determines whether the other vehicle interrupts the own lane; and a collision avoidance unit that executes the collision avoidance control, under a condition where the interruption determination unit has determined that the other vehicle will interrupt the own lane, when the passing determination unit determines that the other vehicle is able to pass across the own lane, and executes the collision avoidance control regardless of a determination of the interruption determination unit, when the passing determination unit determines that the other vehicle is unable to pass across the own lane.

According to the travelling assist apparatus of the present disclosure, when the approach determination unit determines that the other vehicle will enter the own lane, and the passing determination unit determines that the other vehicle is able to pass across the own lane, the collision avoidance control is performed under a condition in which the interruption determination unit has determined that the other vehicle will enter the own lane. Hence, unnecessary collision avoidance control can be reduced when no other vehicle interrupts the own lane. Also, when the approach determination unit determines that the other vehicle will enter the own lane, the passing determination unit determines that the other vehicle is unable to pass across the own lane, regardless of the interruption determination of the interruption determination unit. Accordingly, the collision avoidance control can be promptly performed without waiting for the interruption determination result or omitting the interruption determination. Hence, the processing time can be reduced.

What is claimed is:

1. A travelling assist apparatus adapted for a vehicle provided with an object detection apparatus that detects an object near an own vehicle, capable of executing a collision avoidance control between an other vehicle and the own vehicle, the apparatus comprising:

an approach determination unit that determines whether the other vehicle will enter an own lane where the own vehicle travels, from a first adjacent lane which is adjacent to the own lane;

a passing determination unit that determines whether the other vehicle is able to pass across the own lane to reach a second adjacent lane located opposite of the first adjacent lane with respect to the own lane;

an interruption determination unit that determines whether the other vehicle interrupts the own lane; and
a collision avoidance unit that executes the collision avoidance control, under a condition where the interruption determination unit has determined that the other vehicle will interrupt the own lane, when the passing determination unit determines that the other vehicle is able to pass across the own lane, and executes the collision avoidance control regardless of a determination of the interruption determination unit, when the passing determination unit determines that the other vehicle is unable to pass across the own lane.

2. The travelling assist apparatus according to claim 1, wherein the passing determination unit includes a destination region determination unit that determines whether a destination region, to which the other vehicle is predicted to move passing across the own lane, is secured.

3. The travelling assist apparatus according to claim 1, wherein the passing determination unit comprises:

an approaching vehicle determination unit that determines whether an approaching vehicle moving towards a destination region is present, the destination region being a region to which the other vehicle is predicted to move passing across the own lane; and
a destination collision determination unit that determines whether the other vehicle will collide with the approaching vehicle in the destination region.

4. The travelling assist apparatus according to claim 2, wherein the passing determination unit comprises:

an approaching vehicle determination unit that determines whether an approaching vehicle moving towards a destination region is present, the destination region being a region to which the other vehicle is predicted to move passing across the own lane; and
a destination collision determination unit that determines whether the other vehicle will collide with the approaching vehicle in the destination region.

\* \* \* \* \*